United States Patent [19]

Kuffer

[11] Patent Number: 4,519,707

[45] Date of Patent: May 28, 1985

[54] MULTI-SPECTRAL TARGET DETECTION SYSTEM WITH COMMON COLLECTING MEANS

[75] Inventor: Fernand B. Kuffer, Brea, Calif.

[73] Assignee: General Dynamics, Pomona Division, Pomona, Calif.

[21] Appl. No.: 462,249

[22] Filed: Jan. 31, 1983

[51] Int. Cl.$^3$ ............................................. G01J 3/14
[52] U.S. Cl. .................................. 356/326; 250/339; 356/51; 356/328
[58] Field of Search ................. 356/51, 326, 328, 300; 250/339; 350/168

[56] References Cited

U.S. PATENT DOCUMENTS

| | | | |
|---|---|---|---|
| 1,981,999 | 11/1934 | French | 178/44 |
| 2,527,996 | 10/1950 | Thirard et al. | 88/1 |
| 2,597,001 | 5/1952 | Jaffe | 177/352 |
| 2,651,715 | 9/1953 | Hines | 250/7 |
| 2,679,184 | 4/1954 | Atwood | 88/14 |
| 2,719,457 | 10/1955 | Tripp | 88/72 |
| 2,793,560 | 5/1957 | Rennick | 88/14 |
| 3,034,398 | 5/1962 | Barnes et al. | 88/14 |
| 3,151,247 | 9/1964 | Auvermann | 250/226 |
| 3,173,017 | 3/1965 | Thayer | 250/226 |
| 3,471,214 | 10/1969 | Polanyi | 350/96 |
| 3,630,619 | 12/1971 | Rosen et al. | 356/74 |
| 3,657,549 | 4/1972 | Low et al. | 250/209 |
| 3,829,218 | 8/1974 | Alyanak | 356/326 X |
| 3,945,729 | 3/1976 | Rosen | 356/5 |
| 4,027,974 | 6/1977 | Bumgardner | 356/74 |
| 4,028,544 | 6/1977 | Jourdan et al. | 250/203 R |
| 4,151,752 | 5/1979 | Perdijon | 73/642 |
| 4,282,527 | 8/1981 | Winderman et al. | 343/725 |

FOREIGN PATENT DOCUMENTS

| | | | |
|---|---|---|---|
| 9313 | of 1913 | United Kingdom | 350/168 |
| 352035 | 6/1931 | United Kingdom | 244/3.16 |

OTHER PUBLICATIONS

Anon, *Research Disclosure*, No. 124, Aug. 1974, p. 12.
Sannikov, *Instrum & Exp. Tech.*, vol. 19, No. 5, pt. 2, Sep.–Oct. 1976, pp. 1461–1463.
Orlova et al, *Ind. Lab.*, vol. 44, No. 6, Jun. 1978, pp. 784–787.

*Primary Examiner*—F. L. Evans
*Attorney, Agent, or Firm*—Neil F. Martin; Edward W. Callan; Edward B. Johnson

[57] ABSTRACT

A multi-spectral detection system and method for detecting radiation from a single target within frequency bands that are in diverse portions of the electromagnetic spectrum. The system includes common radiant energy collection elements for collecting radiant energy of different width wavelength bands from a single target feature in the diverse portions of the electromagnetic spectrum and focusing the collected energy to a common focal point; a waveguide positioned at the focal point for transferring the collected radiant energy away from the focal point; an imaging system for dispersing the transferred energy into separate beams having spectral regions respectively corresponding to the diverse portions of the electromagnetic spectrum, with the beams being of uniform cross sectional dimension notwithstanding said different widths, and for focusing the separate beams to a common plane for detection by separately positioned detectors; and separate detectors of uniform cross-sectional area positioned for respectively detecting the separate beams and adapted for respectively detecting energy in the separate spectral regions of the separate beams. Various imaging systems including focusing prisms and focusing grating systems are disclosed.

4 Claims, 7 Drawing Figures

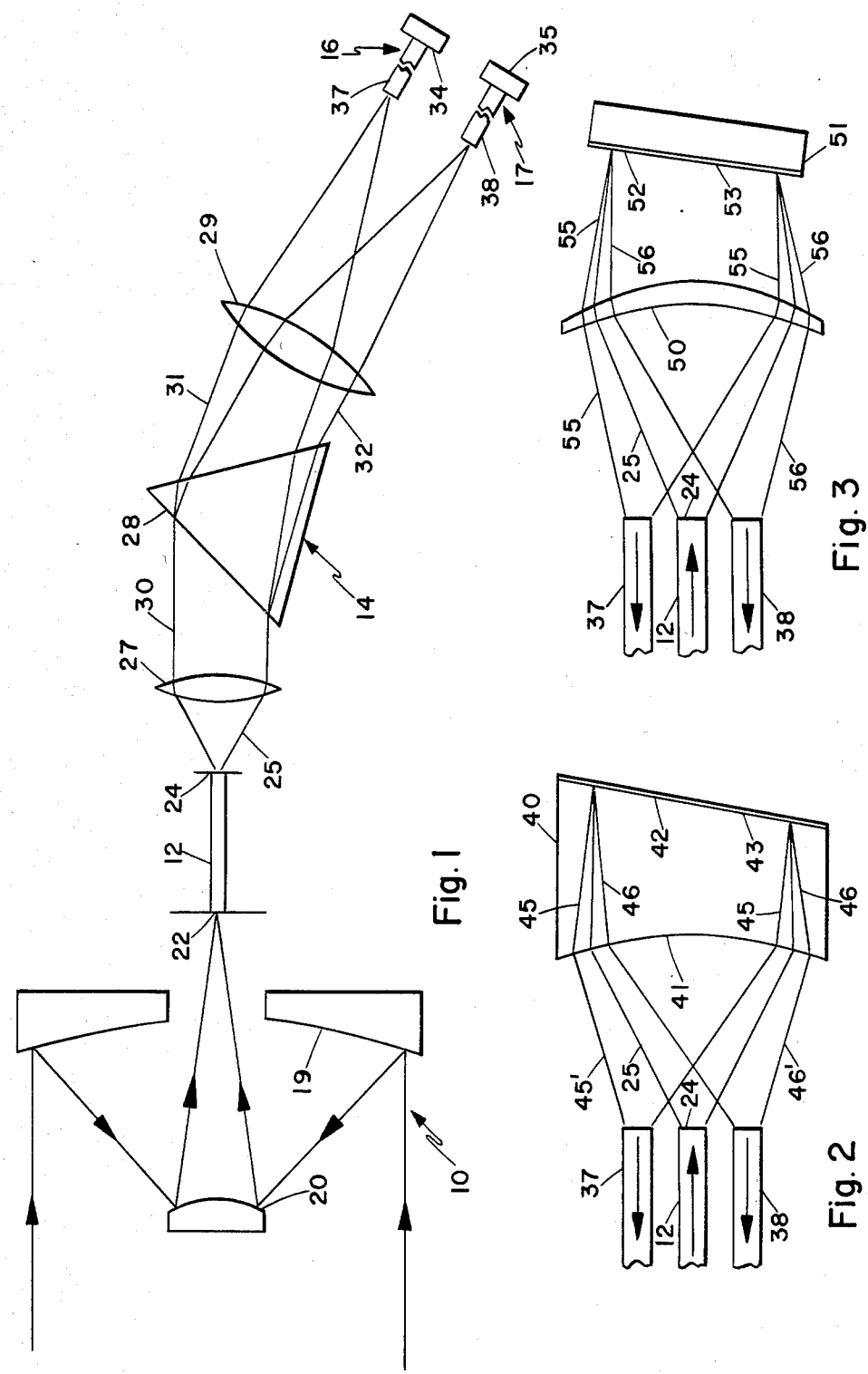

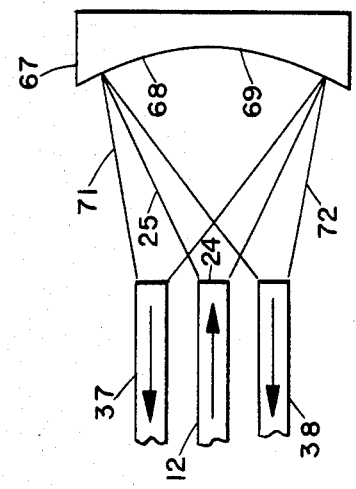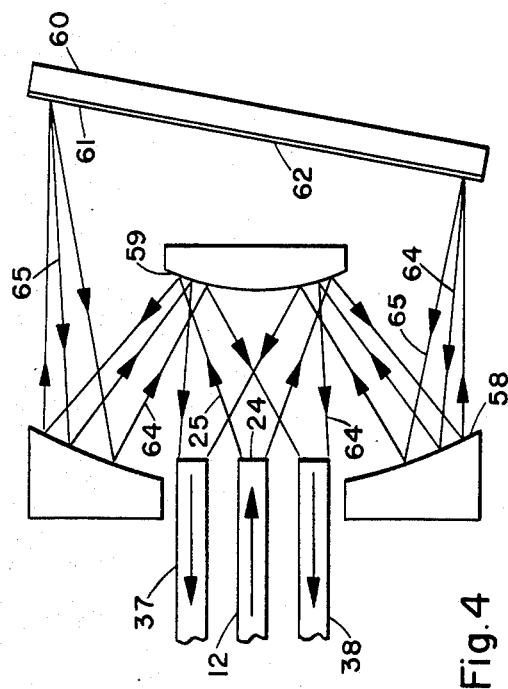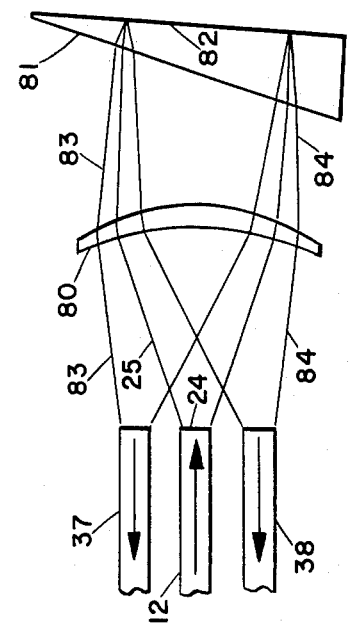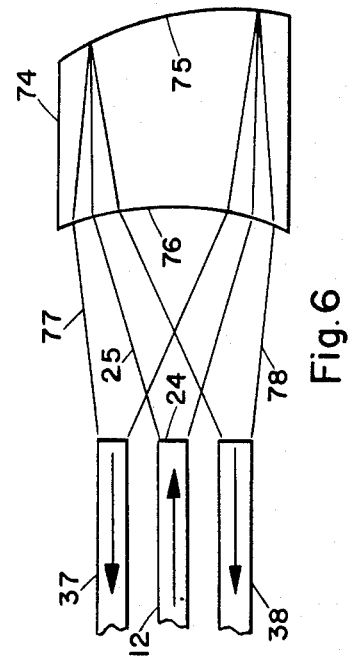

MULTI-SPECTRAL TARGET DETECTION SYSTEM WITH COMMON COLLECTING MEANS

BACKGROUND OF THE INVENTION

The present invention generally pertains to radiant energy collection systems and is particularly directed to an improvement in multi-spectral target detection systems. A multi-spectral target detection system may be used for detecting radiation in diverse portions of the electromagnetic spectrum.

Radio frequency and electro-optical radiation detection systems have been employed to detect the presence of and/or track moving and stationary targets and to measure some of their characteristics. The uses of these systems range from the detection of military targets to the spectral analysis of molten metals.

When separate detectors for detecting radiation from a single target within diverse portions of the electromagnetic spectrum are placed in a common focal plane defind by a radiant energy collection system, the separate detectors do not view the same target feature (and possibly not even the same target) at the same time unless they are axially coincident. This means that several undesirable effects can occur as the target moves or is scanned.

First, not all of the detectors may ever see the same target feature. Second, there is no prdetermined order in which the separate detectors may see a given feature of the target. Third, the separate detectors see either different features of the target or different targets altogether at any given instant. As a result of the first case, no meaningful comparison of radiant energy received by the separate detectors can occur. The second case necessitates complex signal processing for comparison purposes, which produces target misses and false alarms. The third can also results in target misses and false alarms.

If the separate detectors in the same focal plane are axially coincident, they are difficult and expensive to build and lose efficiency due to fabrication and internal absorption.

SUMMARY OF THE INVENTION

The present invention is a multi-spectral target detection system and method that enables full utilization of all of the collected radiation in the diverse portions of the spectrum, thereby enabling simultaneous wavelength analysis of the same feature of the detected target.

The present invention is a multi-spectral detection system and method for detecting radiation from a single target feature within frequency bands that are in diverse portions of the electromagnetic spectrum. The system of the present invention includes common radiant energy collection elements for collecting radiant energy of different width wavelength bands from a single target feature in the diverse portions of the electromagnetic spectrum and focusing the collected energy to a common focal point; an imaging system for dispersing the collected energy into separate beams having spectral regions respectively corresponding to the diverse portions of the electromagnetic spectrum, with the beams being of uniform cross sectional dimension notwithstanding said different widths, and for focusing the separate beams to a common plane for detection by separately positioned detectors; and separate detectors of uniform cross-sectional area positioned for respectively detecting the separate beams and adapted for respectively detecting energy in the separate spectral regions of the separate beams.

Additional features of the present invention are described with reference to the description of the preferred embodiment.

BRIEF DESCRIPTION OF THE DRAWING

FIG. 1 is a schematic diagram of a preferred embodiment of the system of the present invention.

FIGS. 2 through 7 are schematic diagrams of the imaging portion of various alternative preferred embodiments of the system of the present invention.

DESCRIPTION OF THE PREFERRED EMBODIMENTS

A preferred embodiment of the system of the present invention, as shown in FIG. 1, includes a Cassegrain radiant energy collection system 10, a waveguide 12, an imaging system 14 and a plurality of detectors 16, 17. The Cassegrain system 10 includes a primary mirror 19 and a secondary mirror 20. The Cassegrain system 10 collects radiant energy from a single target in diverse portions of the electromagnetic spectrum, such as the visible blue light and infrared portions, and focuses the collected energy in the diverse portions of the spectrum to a common focal point 22.

The waveguide 12 is preferably a light pipe or an optical fiber. The waveguide 12 is coaxially positioned at the focal point 22 for transferring the collected radiant energy away from the focal point 22. The waveguide 12 has a termination 24, from which the transferred energy emerges in a diverging beam 25.

In other embodiments, waveguides having integral rounded end portions or having auxiliary lens arrangements positioned adjacent the waveguide ends can be used to emit the transferred energy in converging or parallel beams.

In still other embodiments, the waveguide 12 can be omitted, whereby the collected energy passes directly from the collection system 10 to an imaging system, which disperses the collected energy into separate beams.

Referring again to the embodiment of FIG. 1, the imaging system includes a first lens 27, a prism 28 and a second lens 29. The first lens 27 collimates the diverging beam 25 to provide a collimated beam 30. The prism 28 disperses the collimated beam 30 into separate beams 31, 32 having spectral regions respectively corresponding to the diverse portions of the spectrum. The second lens 29 focuses the separate beams 31, 32 for detection by the detectors 16, 17.

The detectors 16, 17 are separately positioned for respectively detecting the separate beams 31, 32. The detectors 16, 17 are adapted for respectively detecting energy in the separate spectral regions of the separate beams 31, 32. Each of the detectors 16, 17 preferably includes a sensor 34, 35 and a waveguide 37, 38 positioned for transferring the detected energy of the respective separate beams 31, 32 to the sensor 34, 35. The waveguide 37, 38 is preferably a light pipe or an optical fiber.

Various alternative preferred embodiments of the imaging system portion of the system of the present invention are shown in FIGS. 2 through 7.

Referring first to the embodiment shown in FIG. 2, the imaging portion of the system is a focusing immersed grating system including an element 40. The element 40 has a curved surface 41 for refracting the emergent energy beam 25 that diverges from the termination 24 of the waveguide 12. The back surface 42 of the element 40 is planar and mirrored and has a grating 43 etched thereon for dispersing the incident beam 25 into separate beams 45, 46 having spectral regions respectively corresponding to the diverse portions of the spectrum. The dispersed beams 45, 46 are refracted by the concave surface to provide separate beams 45', 46'. The mirrored surface 42 is disposed at such an angle as to cooperate with the concave surface 41 to cause the separate beams 45', 46' to be focused respectively for detection by the separately positioned detector waveguides 37, 38. In an alternative embodiment the back surface 42 of the element 40 may be curved.

Referring to the embodiment shown in FIG. 3, the imaging portion of the system is a focusing grating system including a lens 50 and a planar mirror 51. The lens 50 is a concave-convex lens for directing the emergent energy beam 25 that diverges from the termination 24 of the waveguide 12 to the mirror 51. The mirror 51 has a mirrored surface 52 having a grating 53 thereon for dispersing the emergent beam 25 directed thereto by the lens 50 into separate beams 55, 56 having spectral regions respectively corresponding to diverse portions of the spectrum. The mirror 51 is disposed at an angle for reflecting the separate beams 55, 56 toward the lens 50 to cause the lens 50 to focus the separate beams 55, 56 for detection by the separately positioned detector waveguides 37, 38.

Referring to the embodiment shown in FIG. 4, the imaging portion of the system is a focusing grating system including a Cassegrain imaging system having a primary mirror 58 and a secondary mirror 59 and a planar mirror 60. The Cassegrain system 58, 59 directs the emergent energy beam 25 that diverges from the termination 24 of the waveguide 12 to the planar mirror 60. The mirror 60 has a mirrored surface 61 having a grating 62 thereon for dispersing the emergent beam 25 directed thereto by the Cassegrain system 58, 59 into separate beams 64, 65 having spectral regions respectively corresponding to diverse portions of the spectrum. The mirror 60 is disposed at an angle for reflecting the separate beams 64, 65 toward the Cassegrain system 58, 59 to cause the Cassegrain system to focus the separate beams 64, 65 for detection by the separately positioned detector waveguides 37, 38.

The use of the Cassegrain system 58, 59 enables a larger mirror 60 to be used, thereby enabling the use of a larger number of lines in the grating 62 for dispersing the emergent beam 25. The resolution of the resultant image of the target is enhanced by using a larger number of grating lines.

Referring to the embodiment shown in FIG. 5, the imaging portion of the system is a focusing grating system including an element 67. The element 67 has a concave mirrored surface 68 having a grating 69 thereon for dispersing the emergent energy beam 25 that diverges from the termination 24 of the waveguide 12 into separate beams 71, 72 having spectral regions respectively corresponding to diverse portions of the spectrum. The element 67 is disposed for causing the concave mirrored surface 68 to focus the separate beams 71, 72 for detection by the separately positioned detector waveguides 37, 38.

Referring to the embodiment shown in FIG. 6, the imaging portion of the system is a focusing prism 74, having a curved mirrored back surface 75 and a curved front surface 76. The curved front surface 76 refracts the emergent energy beam 25 that diverges from the termination 24 of the waveguide 12 and directs the emergent beam 25 to the curved back surface 75. The prism 74 disperses the emergent beam 25 into separate beams 77, 78 having spectral regions respectively corresponding to diverse portions of the spectrum. The prism 74 also focuses the separate beams 77, 78 for detection by the separately positioned detector waveguides 37, 38.

Referring to the embodiment shown in FIG. 7, the imaging portion of the system includes a lens 80 and a Littrow prism 81. The Littrow prism 81 has a mirrored surface 82. The lens 80 is a concave-convex lens for directing the emergent beam 25 that diverges from the termination 24 of the waveguide 12 to the mirrored surface 82 of the prism 81.

The Littrow prism 81 disperses the directed emergent beam 25 into separate beams 83, 84 having spectral regions respectively corresponding to diverse portions of the spectrum. The Littrow prism 81 is disposed at an angle for reflecting and refracting the separate beams 83, 84 toward the lens 80 to cause the lens 80 to focus the separate beams 83, 84 for detection by the separately positioned detector waveguides 37, 38.

The use of prisms takes advantage of the prism's nonlinear index of refraction versus wavelength characteristic to enable energy beams of different width wavelength bands to be focused to detector waveguides 37, 38 having approximately the same cross-sectional area.

If in any of the above-described embodiments, the physical type or positioning of the elements of the imaging portion of the system causes harmonics or subharmonics of energy in the primary frequency band of one separate beam to be focused to the detector which is intended to detect energy in a different primary band, wavelength sensitive filters are used with the respective detectors.

I claim:

1. A multi-spectral detection system for detecting radiation from a single target feature within frequency bands that are in diverse portions of the electromagnetic spectrum, comprising common radiant energy collection means for collecting radiant energy of different width wavelength bands from a single target feature in said diverse portions of the electromagnetic spectrum and focusing said collected energy to a common focal point, imaging means for dispersing said collected energy into separate beams having spectral regions respectively corresponding to said diverse portions of the electromagnetic spectrum, with the beams being of uniform cross-sectional dimension notwithstanding said different widths, and for focusing the separate beams to a common plane for detection by separately positioned detections means; and separate detection means of uniform cross-sectional area positioned in the common plane for respectively detecting energy in the separate spectral regions of the separate beams.

2. A system according to claim 1, wherein the imaging means comprises a focusing prism for dispersing said collected energy into said separate beams and for focusing said separate beams for detection by the separately positioned detection means.

3. A system according to claim 1, wherein the imaging means comprises a lens for directing the collected energy to the mirrored surface of a Littrow prism; and a Littrow prism for dispersing said directed energy into said separate beams and disposed for reflecting said separate beams to the lens to cause the lens to focus said separate beams for detection by the separately positioned detection means.

4. A multi-spectral detection method for detecting radiation from a single target feature within frequency bands that are in diverse portions of the electromagnetic spectrum, comprising the steps of (a) collecting radiant energy from a single target feature in said diverse portions of the electromagnetic spectrum;

(b) focusing said collected energy to a common focal point;

(c) dispersing said collected energy into separate beams having spectral regions respectively corresponding to said diverse portions of the electromagnetic spectrum, with the beams being of uniform cross-sectional dimension notwithstanding said diversity, and for focusing the separate beams to a common plane for detection by separately positioned detection means; and (d) separately detecting energy in the separate spectral regions of the separate beams with separate detection means of uniform cross-sectional area.

* * * * *